W. H. BARBER.
Seed-Planter.

No. 29,853.    Patented Sept. 4, 1860.

Witnesses.
J. W. Coombs.
R. S. Spencer.

Inventor.
W H Barber
per Munn & Co.
Attys

UNITED STATES PATENT OFFICE.

W. H. BARBER, OF WOLCOTTVILLE, CONNECTICUT.

IMPROVEMENT IN SEED-PLANTERS.

Specification forming part of Letters Patent No. 29,853, dated September 4, 1860.

*To all whom it may concern:*

Be it known that I, W. H. BARBER, of Wolcottville, in the county of Litchfield and State of Connecticut, have invented a new and Improved Seed-Planter; and I do hereby declare that the following is a full, clear, and exact description of the same, reference being had to the accompanying drawings, making a part of this specification, in which—

Figure 1:
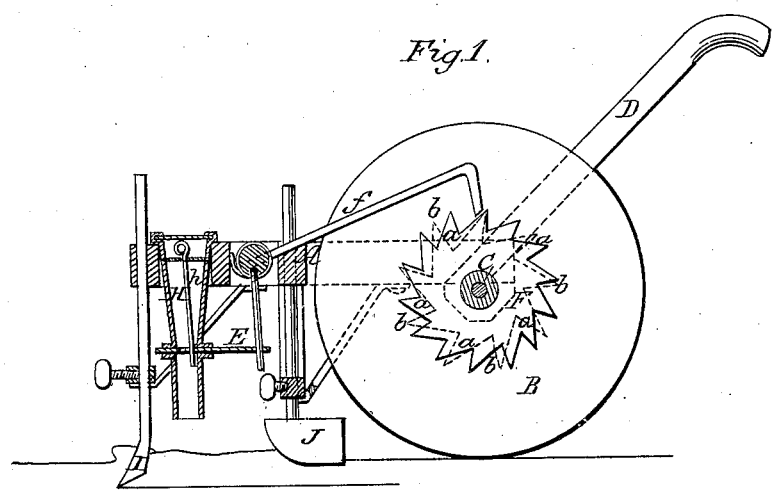
Figure 2:
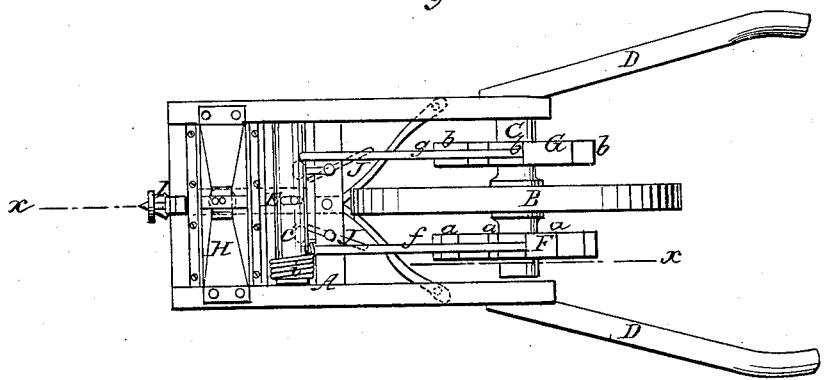

Figure 1 represents a longitudinal vertical section of my invention, the line $x\,x$, Fig. 2, indicating the plane of section. Fig. 2 is a plan or top view of the same.

Similar letters of reference in both views indicate corresponding parts.

To enable those skilled in the art to make and use my invention, I will proceed to describe its construction and operation with reference to the drawings.

The frame A is supported by the wheel B, which is rigidly attached to the driving-axle C. Handles D, which extend from the rear end of the frame A, serve to guide the machine. The motion from the driving-axle is transmitted to the seed-slide E by means of the teeth $a\,b$ of ratchet-wheels F G, which are rigidly attached to the axle C, and which, in rotating with said axle, actuate the rock-shaft $c$, from which an arm, $d$, connects with the seed-slide. The ratchet-wheel F acts on the rock-shaft $c$ by means of a hook or click, $f$, and the ratchet-wheel G by means of a click, $g$, and these clicks are so arranged that either one or the other can be brought in operation. The teeth $a$ of the wheel F are finer than the teeth $b$ of the wheel G, and as both these ratchet-wheels are made of the same diameter the number of strokes imparted to the feed-slide with one revolution of the driving-wheel is smaller and the strokes are longer. If the wheel G is brought in operation and if the wheel F is brought in operation, the strokes of the seed-slide become quicker and shorter. A spring, $e$, on the rock-shaft $c$ keeps the clicks in contact with the ratchet-teeth. The seed-slide E works in the hopper H, and it is connected to a spring, $h$, which extends from the slide in a vertical direction through the center of the hopper, being fastened to a cross-piece, $i$, so that said spring, as it oscillates with the slide, passes through the whole mass of seed contained in the hopper, thereby stirring up the same and facilitating the discharge. If it is desired, the slide E can be taken out and replaced by another, with a larger or smaller seed-cell, as occasion may require.

The seed is deposited in a furrow drawn by an adjustable tooth, I, and it is covered by shares J, which are also adjusted so that their position and that of the tooth can be accommodated to the nature of the soil and to the seed to be sown.

This machine is very small, light, and compact. All its parts are so constructed that it cannot easily get out of order, and it is adapted to various kinds of seed.

Having thus fully described my invention, what I claim as new, and desire to secure by Letters Patent, is—

The arrangement of the wheel B, ratchets F G, clicks $f\,g$, shaft C, rock-shaft $c$, spring $e$, hopper H, spring $h$, slide E, and shares I J, as and for the purpose herein shown and described.

W. H. BARBER.

Witnesses:
HENRY S. BARBOUR,
I. F. CALHOUN.